(12) United States Patent
Hu et al.

(10) Patent No.: US 8,223,136 B2
(45) Date of Patent: Jul. 17, 2012

(54) ERROR DETECTION AND PREVENTION IN ACOUSTIC DATA

(75) Inventors: Yongge Hu, Beijing (CN); Ying Jia, Beijing (CN)

(73) Assignee: Intel Corporation, Santa Clara, CA (US)

( * ) Notice: Subject to any disclaimer, the term of this patent is extended or adjusted under 35 U.S.C. 154(b) by 1685 days.

(21) Appl. No.: 10/563,034

(22) PCT Filed: Jun. 7, 2005

(86) PCT No.: PCT/CN2005/000800
§ 371 (c)(1), (2), (4) Date: Dec. 29, 2005

(87) PCT Pub. No.: WO2006/131021
PCT Pub. Date: Dec. 14, 2006

(65) Prior Publication Data
US 2008/0155117 A1    Jun. 26, 2008

(51) Int. Cl.
*G06F 3/033* (2006.01)

(52) U.S. Cl. ........ 345/179; 345/173; 345/156; 345/177; 178/18.01; 178/19.07; 178/19.02; 709/230; 709/236; 704/211; 704/212

(58) Field of Classification Search .................. 345/173, 345/156, 177, 179; 709/236; 178/18.01–19.07; 704/211, 212; 381/71.1, 150, 337, 371
See application file for complete search history.

(56) References Cited

U.S. PATENT DOCUMENTS

| | | |
|---|---|---|
| 6,592,039 B1 | 7/2003 | Smith et al. |
| 2002/0136298 A1* | 9/2002 | Anantharamu et al. . 375/240.12 |
| 2005/0068581 A1* | 3/2005 | Hull et al. .................... 358/1.16 |
| 2005/0271072 A1* | 12/2005 | Anderson et al. ............. 370/419 |

OTHER PUBLICATIONS

International Search Report from PCT/CN2005/000800 mailed Mar. 23, 2006, 9 pgs.

* cited by examiner

*Primary Examiner* — Lun-Yi Lao
*Assistant Examiner* — Insa Sadio
(74) *Attorney, Agent, or Firm* — Kacvinsky Daisak PLLC

(57) ABSTRACT

A stream of raw acoustic data can be received at a client device. The client device can frame the stream of raw acoustic data at particular intervals with alignment information to create framed acoustic data, and buffer the framed acoustic data while waiting for a data request from a host device. In response to receiving the data request, the client device can provide the framed acoustic data to the host device.

15 Claims, 9 Drawing Sheets

ERROR DETECTION AND PREVENTION IN ACOUSTIC DATA

CROSS-REFERENCE TO RELATED APPLICATION

This application is a National Phase Application of, and claims priority to, International Application No. PCT/CN2005/000800, filed Jun. 7, 2005, entitled ERROR DETECTION AND PREVENTION IN ACOUSTIC DATA.

FIELD OF THE INVENTION

The present invention relates to the field of acoustic data processing. More specifically, the present invention relates to detecting and preventing errors in acoustic data.

BACKGROUND

Acoustic data can be used in computers and consumer electronics for a variety of purposes. An ultrasonic (US) pen is one example. Some US pens can be used like a regular pen to write on a surface, such as a piece of paper or a whiteboard. At the same time however, the motion of the pen can be tracked using a combination of acoustics and electronics to capture the pen's motion.

US pen technology has many applications. For example, as a user writes on a surface, an image of the writing can be captured and shown on a computer display. This can be particularly useful for remote learning. For instance, as a teacher writes on a whiteboard during a class, the writing can be displayed on computer screens for students in the room as well as those located remotely.

As another example, rather than capturing an image of what is written on a surface, a US pen can also be used to move a mouse pointer in a graphical user interface. This can be particularly useful during presentations. For instance, presentations are commonly assembled on a computer and then projected onto a wall screen. With a US pen, a person can interact with the presentation directly from the image projected onto the screen. That is, the person can move the pen over the screen's surface, and the system can capture the motion of the pen and move an image of a mouse pointer on the screen to track the pen's motion. These are just two examples of the many ways in which US pen technology can be used.

Most US pen systems include at least two basic components, the US pen itself and a number of acoustic sensors. The pen usually gives off an inaudible, ultrasonic signal near an end of the pen. For example, the pen may generate the ultrasonic signal whenever the writing end of the pen is in contact with a surface. The acoustic sensors are usually microphones that are capable of detecting the ultrasonic signal. These sensors can be arrayed along one or more edges of a surface, or otherwise placed near the surface, so that two or more of the sensors can separately pick-up the ultrasonic signal from anywhere on the surface. Then, by comparing the signals from two or more of the acoustic sensors, the system can determine, or approximate, the position and motion of the pen on the surface. For example, based on the time delay between the ultrasonic signal as captured by two sensors, the speed of sound, and the relative locations of the two sensors, various algorithms can be used to triangulate a position of the pen and track the pen's motion as the position changes over time.

BRIEF DESCRIPTION OF DRAWINGS

Examples of the present invention are illustrated in the accompanying drawings. The accompanying drawings, however, do not limit the scope of the present invention. Similar references in the drawings indicate similar elements.

DETAILED DESCRIPTION OF THE INVENTION

In the following description, numerous specific details are set forth in order to provide a thorough understanding of the present invention. However, those skilled in the art will understand that the present invention may be practiced without these specific details, that the present invention is not limited to the depicted embodiments, and that the present invention may be practiced in a variety of alternative embodiments. In other instances, well known methods, procedures, components, and circuits have not been described in detail.

Parts of the description will be presented using terminology commonly employed by those skilled in the art to convey the substance of their work to others skilled in the art. Also, parts of the description will be presented in terms of operations performed through the execution of programming instructions. It is well understood by those skilled in the art that these operations often take the form of electrical, magnetic, or optical signals capable of being stored, transferred, combined, and otherwise manipulated through, for instance, electrical components.

Various operations will be described as multiple discrete steps performed in turn in a manner that is helpful for understanding the present invention. However, the order of description should not be construed as to imply that these operations are necessarily performed in the order they are presented, nor even order dependent. Lastly, repeated usage of the phrase "in one embodiment" does not necessarily refer to the same embodiment, although it may.

Acoustic data processing often relies on multiple synchronized channels of data. Any errors in the synchronization may render the data completely useless. Embodiments of the present invention can detect and/or prevent many types of potential synchronization errors in acoustic data. Although embodiments of the present invention are primarily described herein with respect to an ultrasonic pen system, embodiments of the present invention can similarly be applied to a wide variety of technologies that use synchronized acoustic data, such as voice recognition and speaker location technologies.

Figure 1:
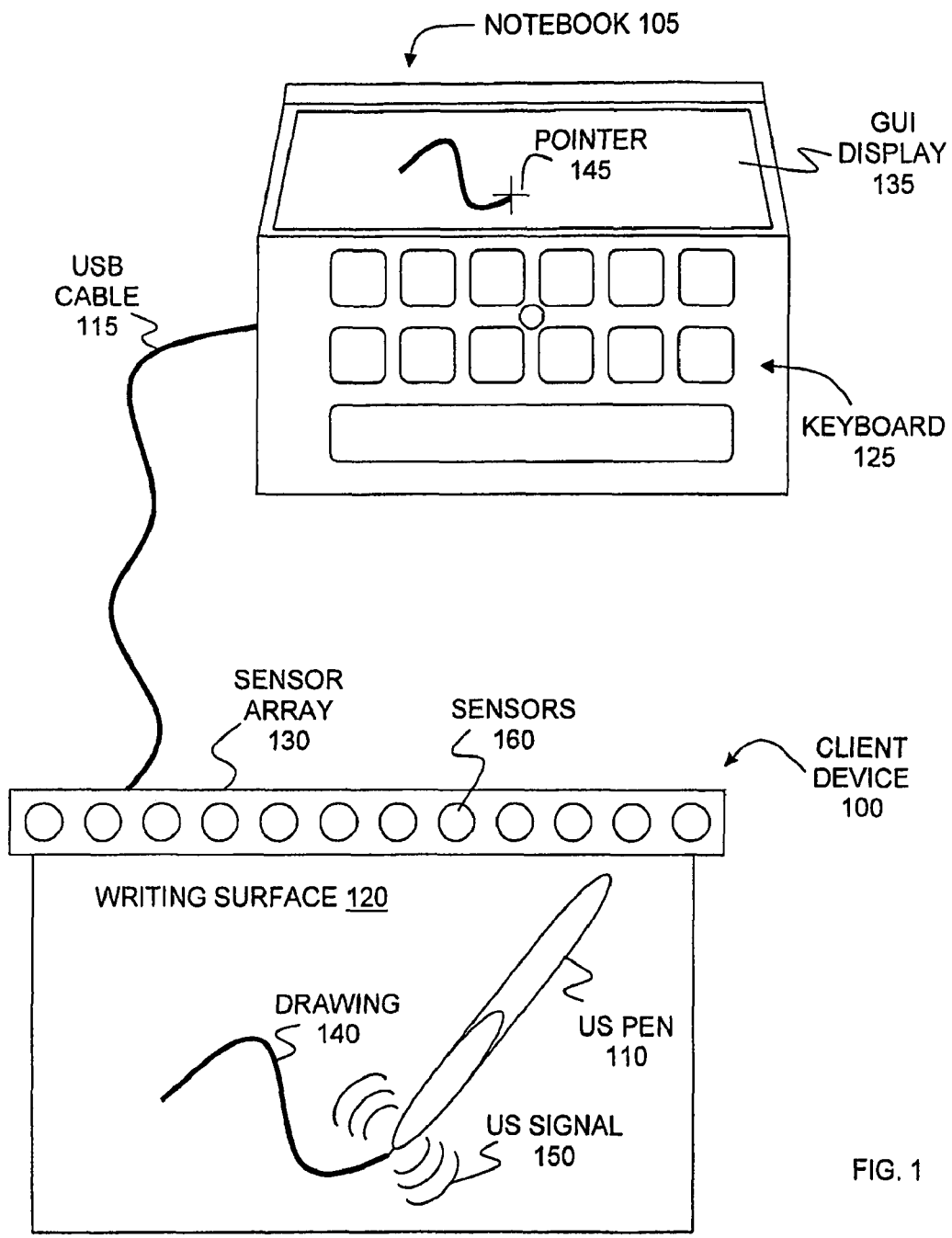
FIG. 1 illustrates one embodiment of an ultrasonic pen system.

FIG. 1 illustrates one example of an ultrasonic (US) pen system in which embodiments of the present invention can be used. A client device 100 may include a US pen 110, a writing surface 120, and a sensor array 130. US pen 110 can be used to make a drawing 140 on surface 120. While pen 110 is in contact with surface 120, the pen can also give off an ultrasonic signal 150 near the writing end of the pen.

Sensor array 130 can include a number of ultrasonic sensors 160 positioned along an edge of writing surface 120. Each sensor 160 may be able to receive ultrasonic signal 150. The signal that is captured by each sensor 160 can comprise a separate channel of acoustic data. The illustrated embodiment includes 12 sensors 160, which means the illustrated sensor array can capture up to 12 channels of acoustic data.

The 12 channels of data can be provided to a host device through a communications medium. In the illustrated embodiment, the host device is a notebook computer 105 and the communications medium is a universal serial bus (USB) cable 115. Notebook 105 may include a keyboard 125 and a display 135 for displaying a graphical user interface (GUI). The 12 channels of data can be used by notebook 105 to control the position of a pointer 145 in display 135 and/or capture and display drawing 140.

For instance, since the distance from pen 110 to any pair of sensors 160 is likely to be different, the amount of time that signal 150 takes to reach the pair of sensors is likely to be different. This propagation delay between two channels of acoustic data can be used to calculate a position of pen 110, but only if the system knows from which two sensors the channels of data came. In other words, the system needs to be able to distinguish among channels of acoustic data. Any errors in the data can render the calculations useless.

Notebook 105, however, may manage a number of simultaneous activities, frequently switching the machine's resources from one activity to another. Client device 100 may need to store the acoustic data while notebook 105 is performing other tasks. Each channel of data can be converted to a series of data samples and the samples can be synchronously interleaved and stored in memory. That is, a data sample from channel 1 can be followed in memory by a data sample from channel 2, which can be followed by a data sample from channel 3, and so on up to channel 12. The pattern can repeat, storing data samples from channels 1 through 12 at some periodic rate.

Then, from time to time, when notebook 105 shifts its attention to client device 100, notebook 105 can retrieve a burst of data from client 100. Once the data is stored in notebook 105, it can process the data at a slower rate. As long as notebook 105 retrieves more data from client 100 before the previously retrieved data is all processed, and as long as there are no errors in the stream of data, notebook 105 can smoothly display motion captured from US pen 110.

Unfortunately, notebook 105 may not retrieve data from client 100 in a timely manner. For example, many US pen systems expect the host system to retrieve acoustic data at 1 millisecond intervals, but the actual delay between retrievals may be 10 seconds or more on rare occasions. If the buffer in the client device fills up before the host device retrieves it, some data will probably be lost, potentially disrupting the synchronized alignment of the data samples. For example, where the host device expects twelve samples, all from a particular instant in time, from channels 1 through 12, the host may receive two samples from channels 1 and 2 from one instant in time, eight samples from channels 5-12 from a later instant in time, and another two samples from channels 1 and 2 from a still later instant in time. Needless to say, if the system fails to recognize the errors in the data, the system will probably calculate an incorrect position for the pen.

Some variation in the time interval between data retrievals from the host can be absorbed using a larger buffer in the client device. The amount of data, however, can accumulate quickly. For example, if each data sample is two bytes, there are eight channels of data, and each channel is sampled at 48 KHz, 768 K bytes of data can accumulate per second. 10 seconds of data would take up about 7.7 M bytes of memory. A buffer large enough to store that much data could be relatively expensive, and much of the capacity could go un-used most of the time because a 10 second interval would likely happen only rarely.

Even with a buffer large enough to hold 10 seconds worth of data, data errors could still occur because the host device may occasionally stall for more than 10 seconds. Data can also get lost elsewhere in the system, usually while the data is being handled by software in the host device. The size of the buffer in the client device may be irrelevant to these other kinds of data errors.

Embodiments of the present invention can eliminate the impact of many data errors in synchronized, multi-channel acoustic data by inserting alignment information into the data stream so data errors can be detected, and/or by reducing the chances of data errors due to buffer overflows in the client device.

Figure 2:
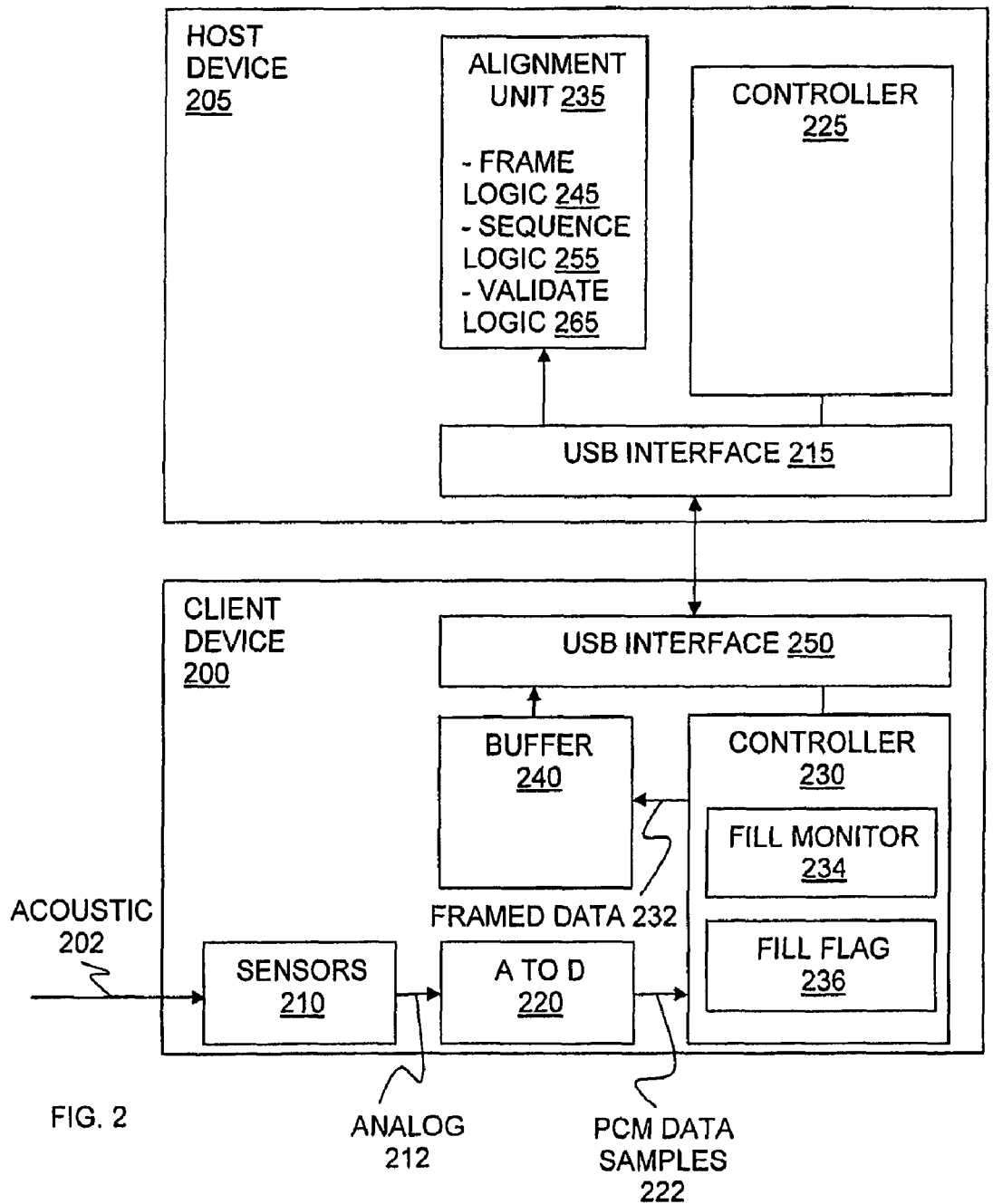
FIG. 2 illustrates a block diagram of one embodiment of an ultrasonic pen system.

FIG. 2 illustrates a block diagram of an example US pen system in which embodiments of the present invention can be used. Client device 200 can include sensors 210, analog-to-digital converters (ADCs) 220, a controller 230, a buffer 240, and a USB interface 250. Sensors 210 can include an array of acoustic receivers that can convert the acoustic signal 202 into multiple channels of analog electric signals 212. A separate ADC 220 can sample each analog electric signal 212 and convert the signal into a raw stream of digital data samples. In the illustrated embodiment, the data samples comprise pulse code modulation (PCM) data 222, which are usually two byte, signed-magnitude digital samples.

Rather than simply storing the data samples in buffer 240 until retrieved by the host device 205, controller 230 can insert alignment information into the stream of samples at particular intervals to created framed data 232 before the data are stored in buffer 240. For example, the alignment information can include frame boundary identifiers and frame sequence numbers. The alignment information can be used in higher levels of the system to recognize when data have been lost so that, for example, one or more frames of data can be dropped until the data are realigned. More detailed examples of these procedures will be described below.

In the illustrated embodiment, controller 230 also includes a fill monitor 234 and a register to store a fill flag 236. The fill monitor and fill flag can help the system absorb most fluctuations, or jitter, in the time interval between retrievals from the host. As data flows into and out of buffer 240, fill monitor 234 can compare the amount of data stored in the buffer to various thresholds and set the value of the fill flag 236 based on the comparison. For example, if the amount of data is below a low threshold, monitor 234 may set fill flag 236 to a low level. If the amount of data is above a high threshold, monitor 234 may set fill flag 236 to a high level.

When host device 205 is ready to retrieve data from client device 200, controller 225 can send a "get data" signal from USB interface 215 to USB interface 250. Rather than providing the same amount of data in response to each "get data" signal, controller 230 can send an amount of data based on the level of the fill flag 236. For example, if the level of the fill flag is low, controller 230 can send a smaller amount of data than if the fill flag is high. Controller 230 can also send the fill flag back to controller 225 in the host device along with the data so controller 225 can determine how much data to expect. Using the fill monitor, if the interval between retrievals is longer than normal, client device 200 can send more data than normal to reduce the chances of overflowing the buffer and loosing data.

In addition to controller 225 and USB interface 215, host device 205 can include an alignment unit 235. Alignment unit 235 can include logic 245 for recognizing frame boundaries in the data, and logic 255 for identifying sequence information associated with each frame boundary. Based on the frame boundaries and sequence information, logic 265 can validate or invalidate a frame worth of data at a time.

Figure 3:
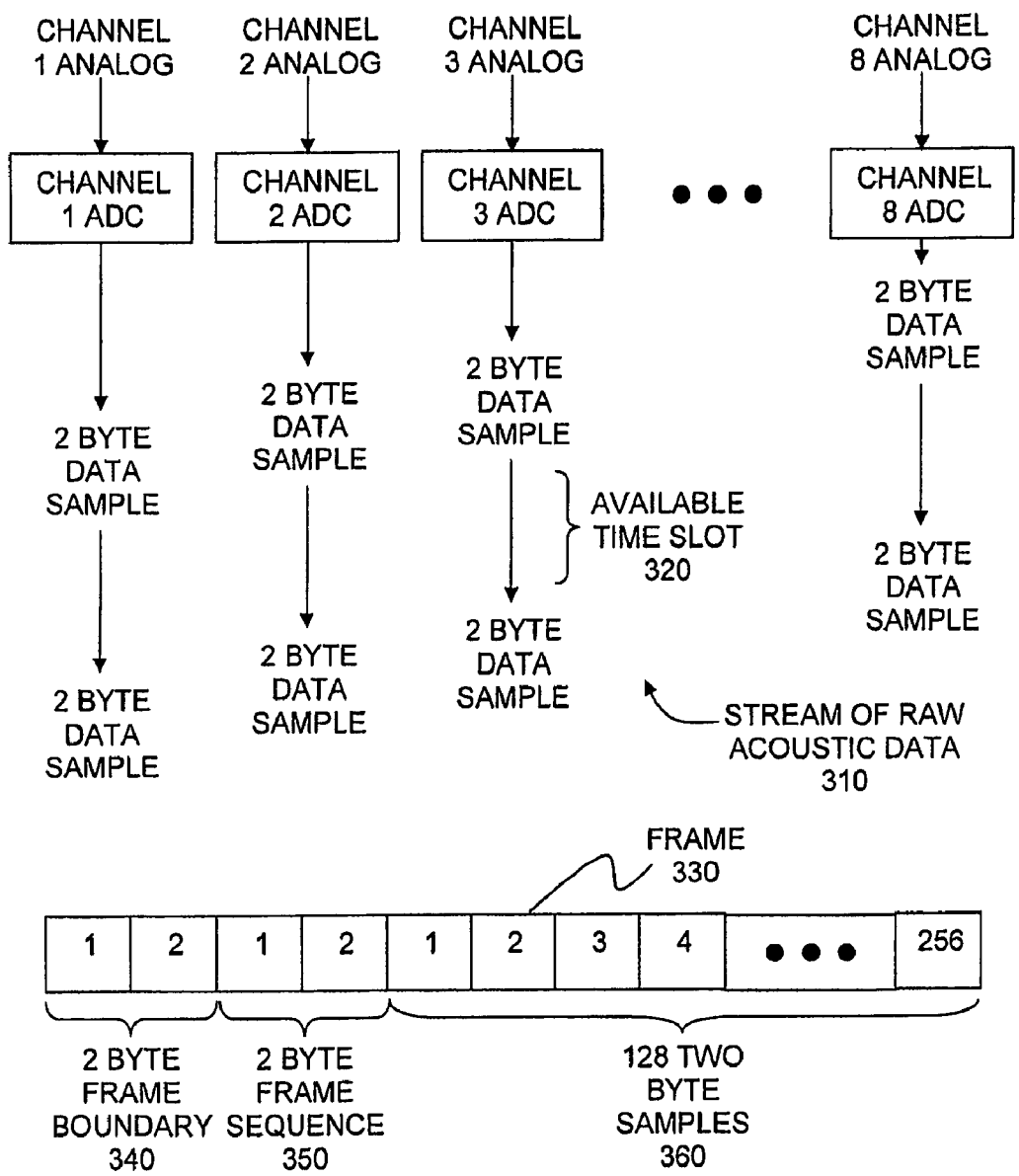
FIG. 3 illustrates an example of a raw stream of acoustic data and how it can be framed.

FIG. 3 illustrates one embodiment of a stream of synchronous, multi-channel data, and how that stream of data may be framed. The example includes eight channels of analog data that are converted to two byte data samples by eight analog-to-digital converters (ADCs). The stream of raw acoustic data 310 can comprise a 2 byte data sample from channel 1, followed in time by a 2 byte data sample from channel 2, and so forth through channel 8, before repeating the order. In each channel, there can be an available time slot, such as time slot 320, between data samples. Alignment data can be inserted into the stream of raw acoustic data 310 using these available time slots.

For instance, as shown in frame 330, four bytes of alignment information can be inserted as a frame header. In this example, the frame header includes a two byte frame boundary 340 and a two byte frame sequence 350. Boundary 340 can be used to find the beginning of a frame when the framed data are being checked for errors. The data pattern for the boundary could be the same in each frame. Any number of patterns could be used, such as a pattern that is unusual or does not occur in the raw acoustic data. For example, if the data samples are signed magnitude, two byte samples, the boundary pattern may be $7FFF_{16}=0111\ 1111\ 1111\ 1111_2$. This value is the maximum positive value that can be represented in a signed magnitude, two byte data sample, and is unlikely to occur in the raw data stream under normal circumstances. When this data pattern is detected, it can be a good indication that a frame boundary has been found.

Sequence 350 can define where in a series of frames the current frame belongs. Sequence 350 may be a number that is incremented once for each frame. For example, if sequence 350 is a two-byte, unsigned number, it can represent up to 65,536 values. If the frame sequence of the first frame is zero, the frame sequence field can number 65,536 more frames before wrapping back to zero. Once a frame boundary is identified, the frame sequence of the current frame can be compared to the frame sequence of a previous frame. If the current frame sequence appropriately follows the previous frame, it can be a good indication that no data was lost between the two frames.

Following the header information, a certain number of data samples can fill in payload 360. In this example, payload 360 includes 128 two byte data samples, or 256 bytes of data.

Figure 4:
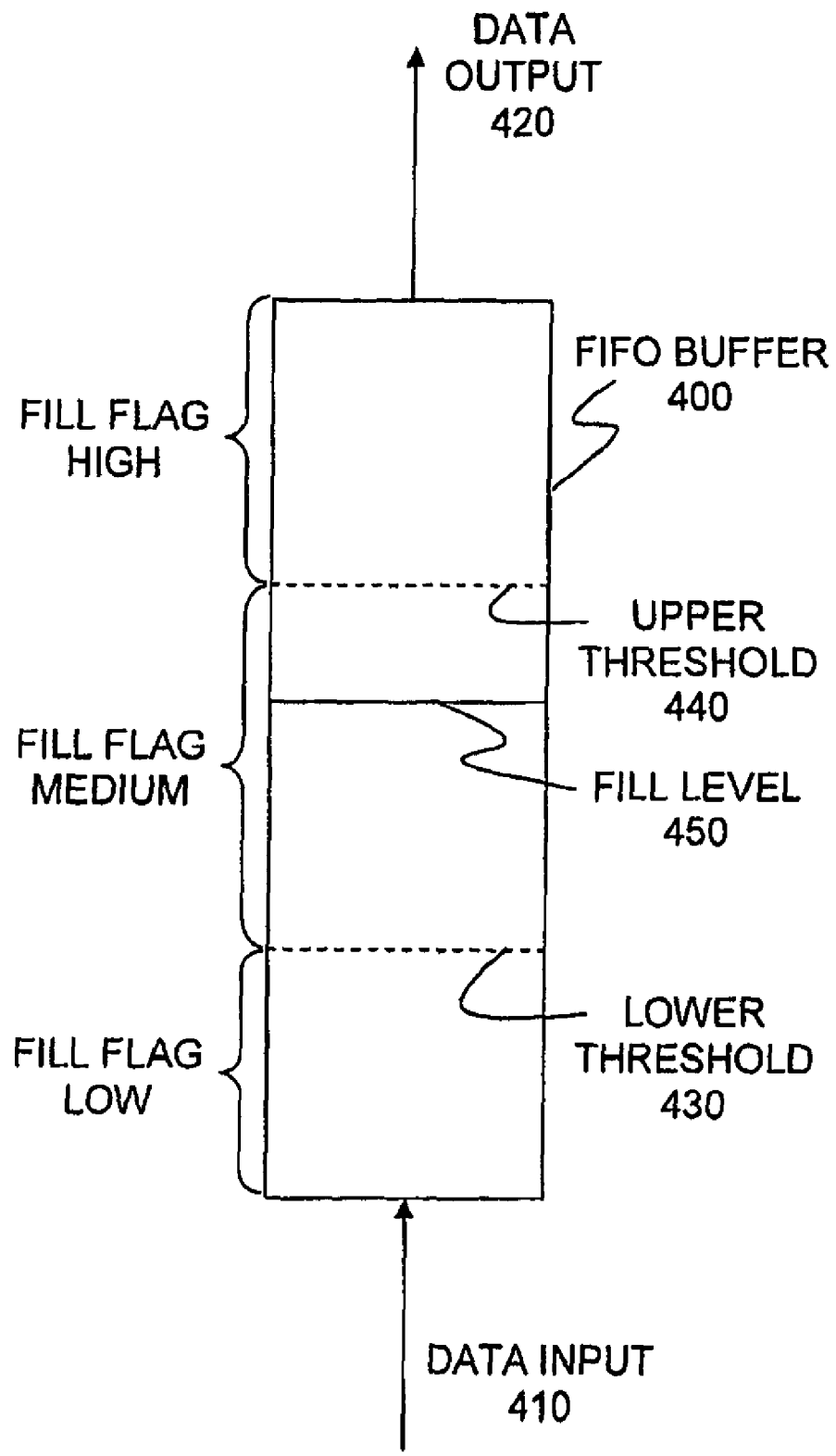
FIG. 4 illustrates one embodiment of a buffer with fill flags.

FIG. 4 illustrates one example of a buffer 400, and how a fill flag may be set as data flows in and out of the buffer. In the example, buffer 400 is a first-in-first-out (FIFO) buffer. Conceptually, as data enters buffer 400 at the data input 410, the data will leave buffer 400 at the data output 420 in the same order. If, on average, data is entering buffer 400 faster than it is leaving, fill level 450 will increase. If, on average, data is leaving buffer 400 faster than it is entering, fill level 450 will decrease. In the example, there are two threshold levels associated with buffer 400, a lower threshold 430 and an upper threshold 440, and the fill flag can be set to three different levels, low, medium, and high. When fill level 450 is below threshold 430, the fill flag can be set to low. When fill level 450 is between thresholds 430 and 440, the fill flag can be set to medium. And, when fill level 450 is above threshold 440, the fill flag can be set to high.

In many cases, using the fill flag to adjust the amount of data sent to the host can significantly reduce the frequency of data errors due to buffer overflow, while using a relatively small buffer size. As an example, buffer 400 may store in excess of 1024 K bytes of data, lower threshold 430 may be at 384K bytes, and upper threshold 440 may be at 1024 K bytes. In this example, when the fill flag is low, the client device may send 384 K bytes in response to a "get data" message from the host device. When the fill flag is medium, the client may send 768 K bytes. And, when the fill flag is high, the client may send 1024 K bytes.

FIGS. 1-4 illustrate a number of implementation specific details. Other embodiments may not include all the illustrated elements, may arrange the elements differently, may combine one or more of the elements, may include additional elements, and the like. For example, in FIG. 1, the sensors in the sensor array could be arranged differently, a wide variety of computer and/or consumer electronics devices could be used for the host device, and any number of communications mediums could be used to connect the client and host devices including a serial cable, a wireless connection, an optical connection, or an internal network connection where the client and host are components within a larger device. Similarly, in FIG. 2, the functions of the various blocks could be implemented in any number of ways, including a field programmable gate array, firmware, software executed by a processor, and the like. In FIG. 3, virtually any frame structure could be used. For instance, the alignment data could trail the payload rather than lead the payload, the frame boundaries and frame sequence could both be identified using one field rather than two, the frame sequence could be represented in data formats other than unsigned magnitude, data samples could be larger or smaller, the payload could be larger or smaller, the payload size could vary from frame to frame, in which case the header could include the payload size as well as the frame boundary and sequence information, and the like. In FIG. 4, the buffer could include more thresholds or just one threshold, the fill flag could be represented in any number of ways, such as a two bit value or a byte of data, any number of memory technologies could be used for the buffer, and the like.

Figure 5:
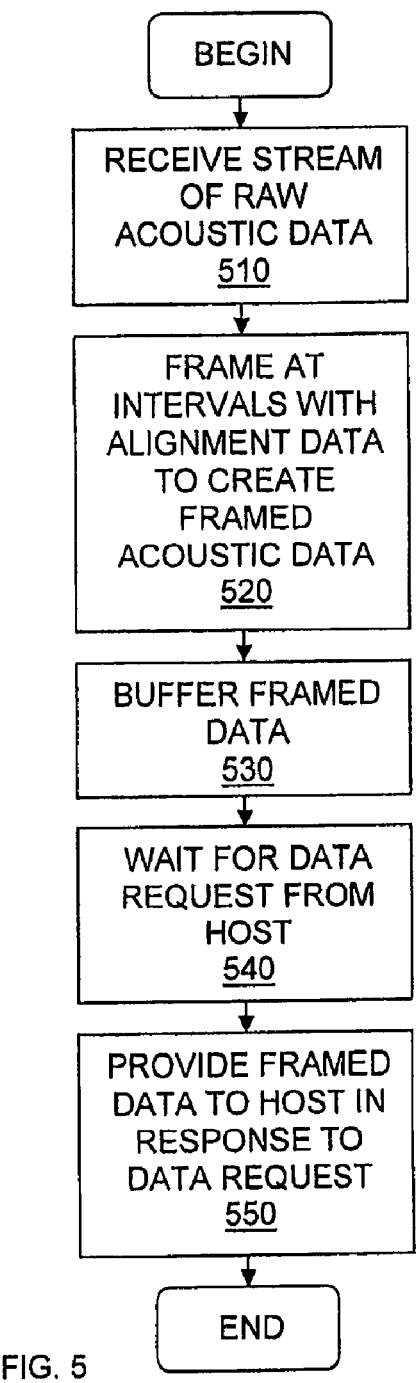
FIG. 5 illustrates one embodiment of a client device process.

FIGS. 5-11 illustrate several examples of processes that embodiments of the present invention may perform. FIG. 5 represents a high level process that could be performed by a client device. At 510, the client can receive a stream of raw acoustic data. At 520, the client can frame the stream of data at intervals with alignment data to create framed acoustic data. The framed acoustic data can be buffered by the client at 530 while the client waits for a data request from a host device at 540. Then, at 550, when and if a data request is received, the client device can provide the framed data to the host and end.

In an alternate example, this process can be thought of as two simultaneous and on-going processes. One process can receive, frame, and buffer the data. The other process can wait for data requests and provide the requested data from the buffer when a request is received.

Figure 6:
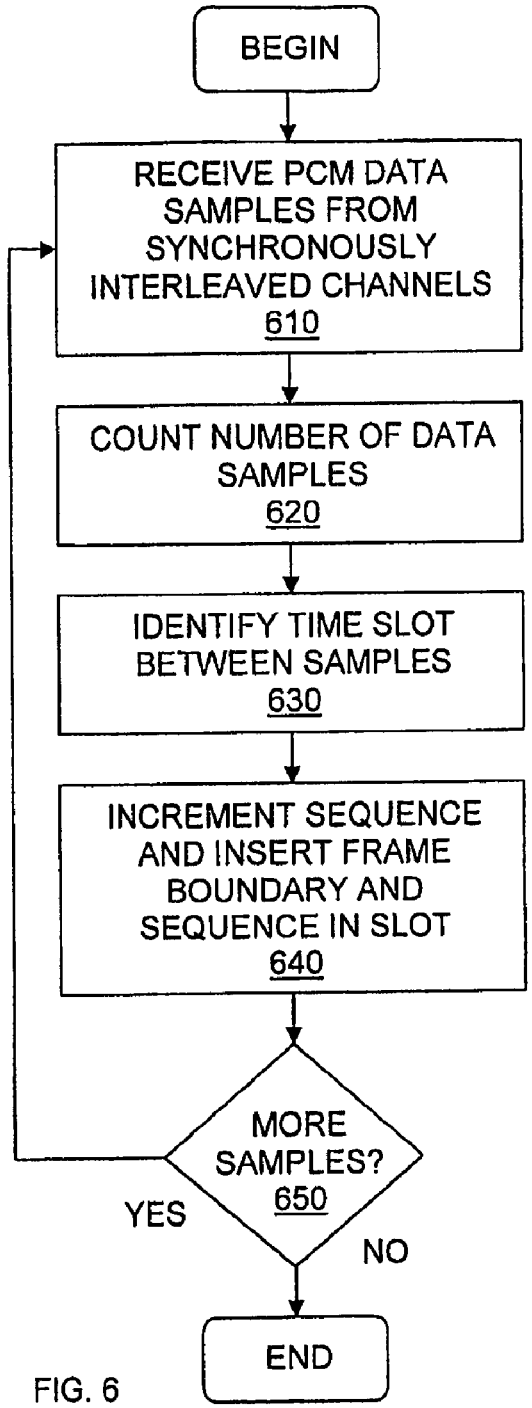
FIG. 6 illustrates one embodiment of a framing process.

FIG. 6 illustrates an example of a framing process that could be used by a client device. At 610, the process can receive pulse code modulated (PCM) data samples from synchronously interleaved acoustic channels. At 620, the process can count a particular number of data samples to fill a frame payload. For example, where the frame payload is fixed at 128 samples per frame, the process may count the data samples by counting 256 bytes of data. At 630, the process can identify a time slot between data samples once the payload is filled. For example, the process can find an available time slot between data samples from a channel of data. At 640, the process can increment a sequence number and insert a frame boundary and the sequence number into the available time slot. Then, at 650, if there are more data samples to be framed, the process can return to 610 to frame more data. Otherwise, the process can end.

In this example, the alignment information (the boundary and sequence number) may appear to follow the payload in the framed data stream rather than lead the payload. The distinction, however, can be largely irrelevant. Complete frames of data do not necessarily have to travel together as a unit. For example, when a host device retrieves data from a client device, the amount of data that is retrieved does not necessarily have to be aligned to a frame boundary. The alignment information can simply flow along with the rest of the data.

Figures 7, 8:
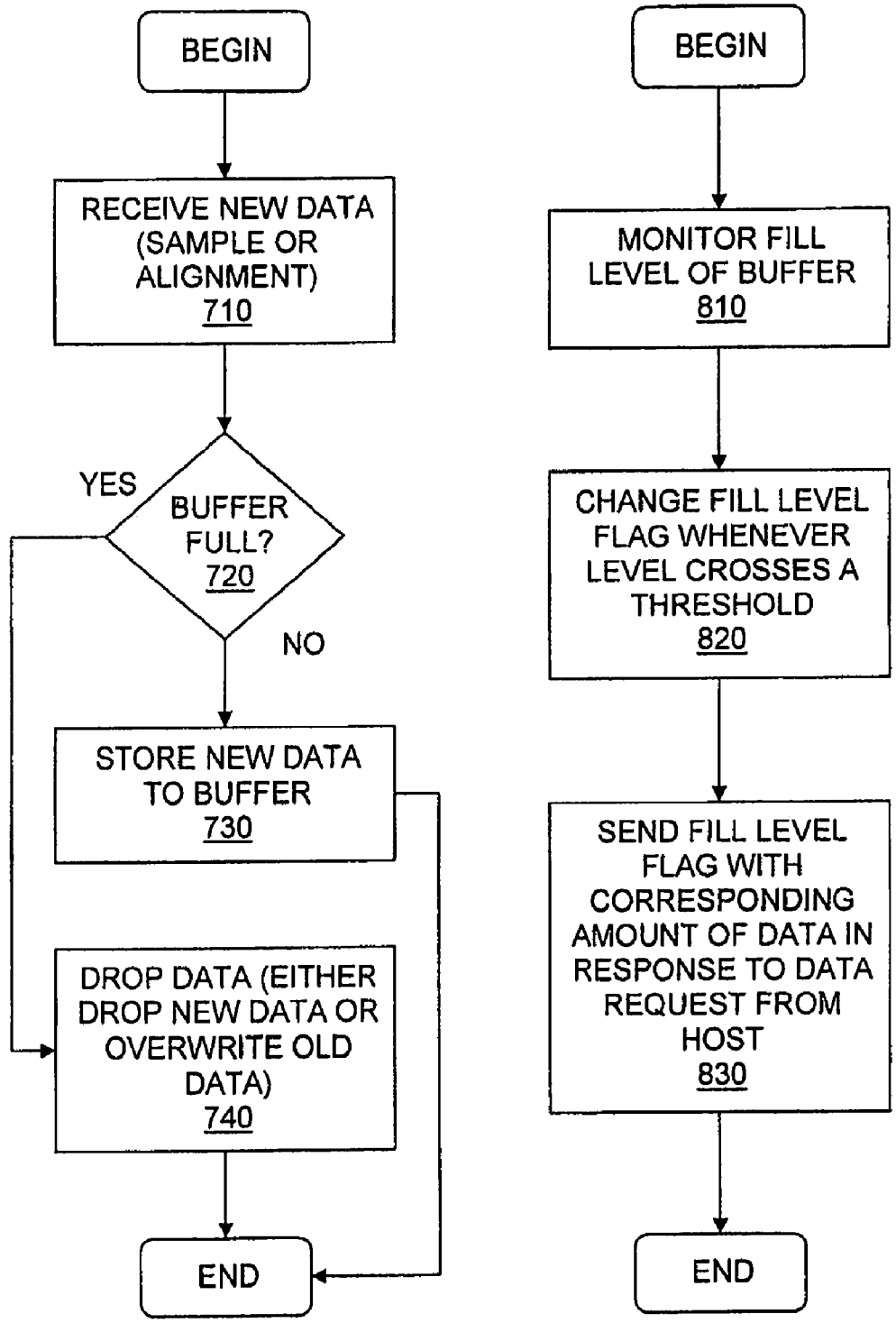
FIG. 7 illustrates one embodiment of a buffer filling process.
FIG. 8 illustrates one embodiment of a fill monitor process.

FIG. 7 illustrates an example of a buffer filling process that could be used by a client device. At 710, the process can receive new data. The data could be a data sample from an acoustic channel, or the data could be alignment data inserted into the data stream by the client. At 720, if the buffer is not already full, the process can store the new data to the buffer at 730 and end. If, however, the buffer is full at 720, the process can drop data at 740 and end.

Data can be dropped in any number of ways. For instance, the new data could simply overwrite old data in the buffer. In which case, the process may not actually make a decision at 720. Instead of making a decision, the process may blindly write the new data to the next available memory location in the buffer. On the other hand, the new data could be dropped and the old data in the buffer could be retained. In which case, the decision at 720 may involve identifying whether the buffer is full.

FIG. 8 illustrates an example of a fill monitor process that could be used by a client device. At 810, the process can monitor the fill level of a buffer. At 820, the process can change a fill level flag whenever the fill level crosses a threshold. And, at 830, the process can send the fill level flag along with a corresponding amount of data in response to a data request from a host device.

Figure 9:
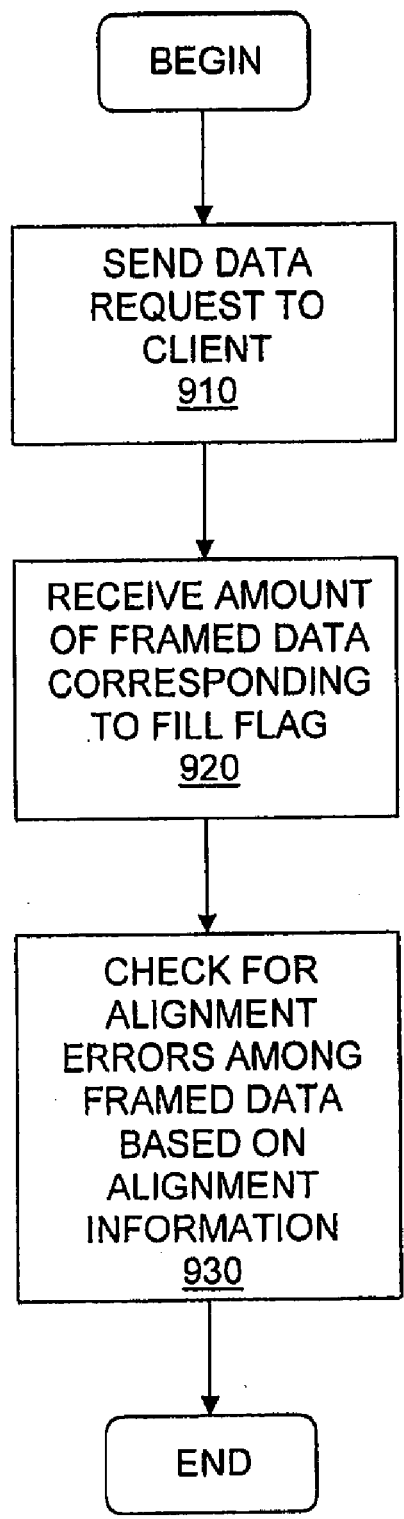
FIG. 9 illustrates one embodiment of a host device process.

FIG. 9 illustrates an example of a high level process that could be used by a host device. At 910, the host can send a data request to a client device. At 920, the host can receive a particular amount of framed data from the client in response to the request. The data may be accompanied by a fill flag, which can indication just how much data the host should expect. Then, at 930, the host can check for alignment errors among the framed data based on alignment information inserted in the data by the client.

Figure 10:
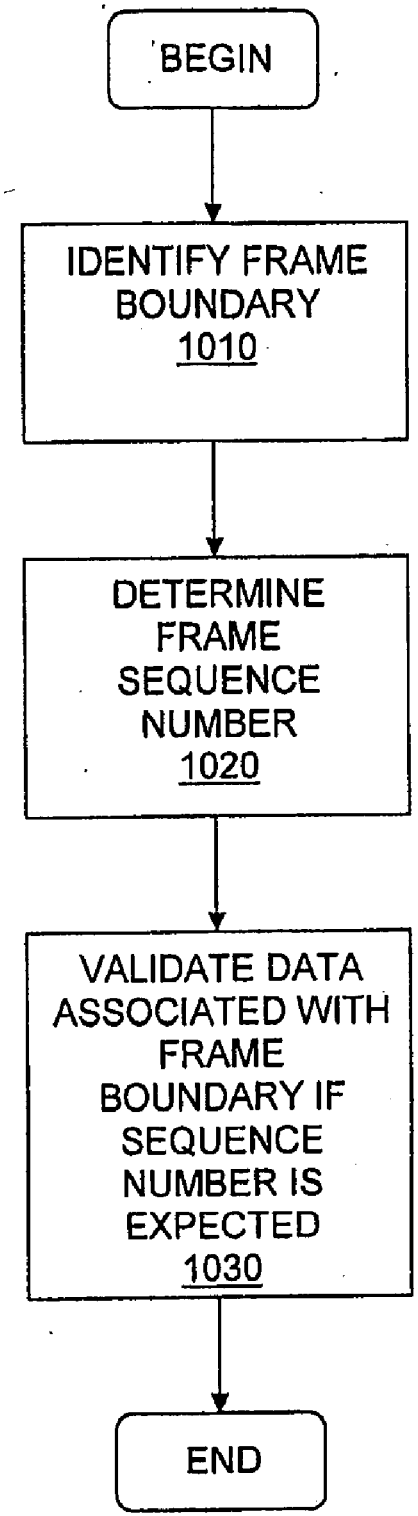
FIG. 10 illustrates one embodiment of an error detection process.

FIG. 10 illustrates an example of an error detection process that could be used by a host device. At 1010, the process can identify a frame boundary. For example, this could involve identifying a data sample that contains a certain bit pattern. At 1020, the process can determine the frame sequence number associated with the frame boundary. Then, at 1030, the process can validate a payload worth of data samples associated with the frame boundary if the sequence number is the expected sequence number. For instance, if the sequence number of the last frame was 42, then the expected sequence number for the current frame may be 43. In one example, if the sequence number is not the expected sequence number, the host device may invalidate data until a pair of sequence numbers are found that are in the expected order.

Figure 11:
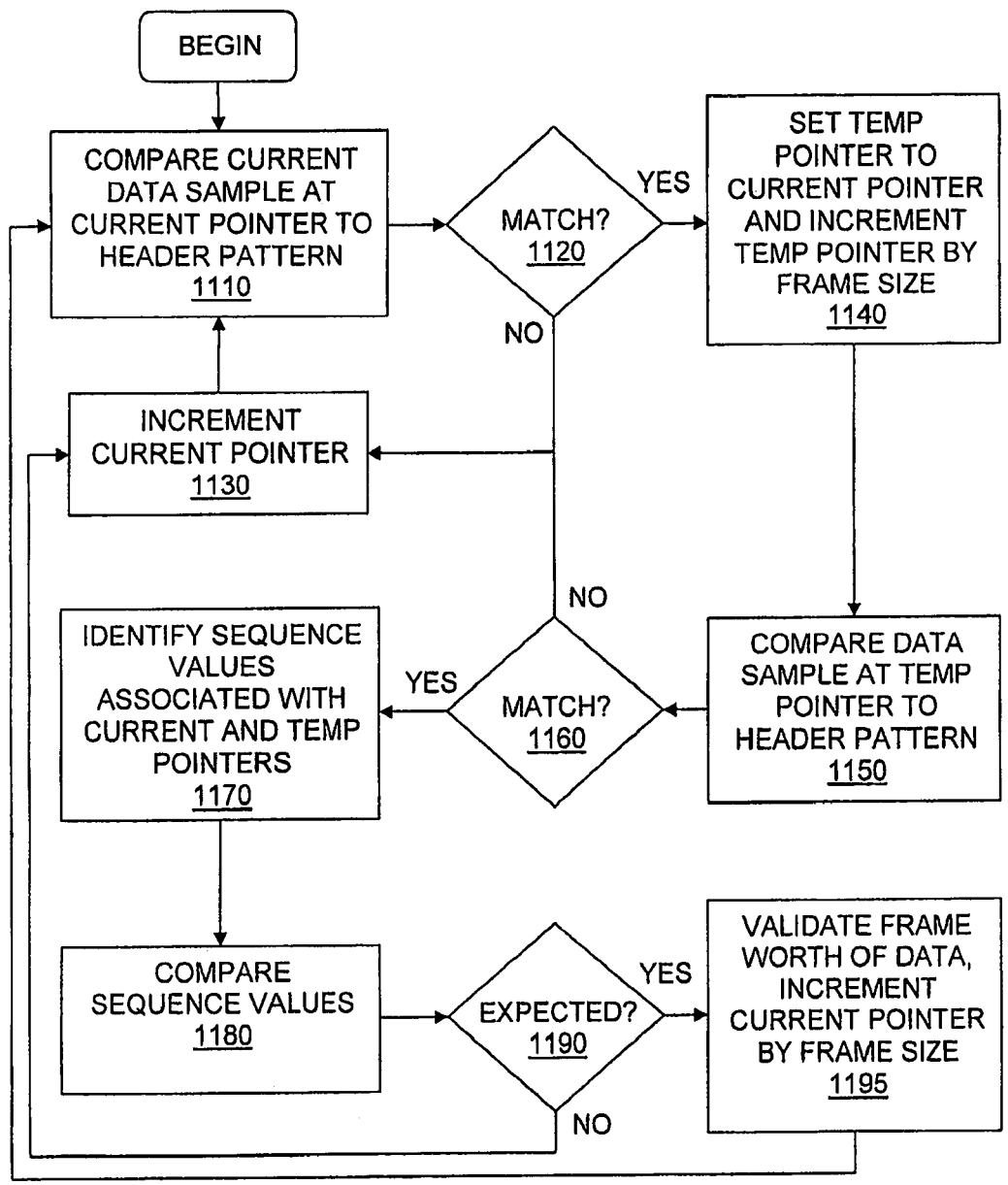
FIG. 11 illustrates another embodiment of an error detection process.

FIG. 11 illustrates one example of an error detection process in more detail. In the illustrated example, the process uses two pointers to select individual data samples in a stream of data, a current pointer and a temporary pointer. The "current" data sample is the data sample to which the current pointer is pointing. At 1110, the process can compare the current data sample to a header pattern. The header pattern could be a uniquely distinctive or an unusual data pattern in the stream of data. If the current data sample does not match the header pattern at 1120, the process can increment the current point at 1130 to point to a next location and return to 1110 to compare the data sample at that next location to the header pattern.

In one example, the header pattern can be two bytes wide, and the current pointer can point to an individual byte in the data stream. In which case, comparing the current data sample to the header pattern could be a two part process. First, the process may compare the byte of data indicated by the current pointer to a first byte of the header pattern, and, second, the process may compare a next byte in the data stream to a second byte of the header pattern. If the pairs of bytes do not match, the process can advance one byte and compare the byte that was previously compared to the second byte of the header pattern to the first byte of the header pattern.

Referring again to FIG. 11, if the data sample does match the header pattern at 1120, this may be a pretty good indication that a frame boundary has been found. However, if the header pattern could appear in an acoustic data sample, simply finding the pattern once may not be good enough. In which case, at 1140, the process can set the temporary pointer equal to the current pointer, and then increment the temporary pointer by the size of a frame. In other words, the process can use the temporary point to jump ahead and point to the position in the data stream where the next frame boundary should be if the data sample at the current pointer is indeed a frame boundary.

At 1150, the process can compare the data sample at the temporary pointer to the header pattern. Again, this could be a two part process if the header pattern is two bytes wide. If, at 1160, the data sample does not match the header pattern, then there is probably either a data error somewhere between the pointers, or the data sample at the current pointer is not actually a frame boundary. In which case, the process can loop back to 1130 to increment the current pointer and start again at 1110 with the next data sample.

If, however, the data sample at the temporary pointer does match the header pattern at 1160, the process can identify sequence values associated with the current pointer and the temporary pointer at 1170. For example, if the alignment data comprises two bytes of frame boundary followed by two bytes of sequence number, and the pointers can select individual bytes, the process can find what should be the sequence numbers by combining the two bytes of data at two and three positions past the current pointer, as well as the two bytes of data at two and three positions past the temporary pointer.

At 1180, the process can compare the two sequence numbers. If the second sequence number is not the expected sequence number at 1190, then there is probably a data error somewhere between the pointers, or the data sample at the current point is not actually a frame boundary. In which case, the process can loop back to 1130 to increment the current pointer and start again at 1110 with the next data sample.

If, however, the second sequence number is the expected sequence number at 1190, there is a very good likelihood that there are no data errors between the two pointers. In which case, at 1195, the process can validate a frame worth of data following the current pointer, increment the current pointer by the size of a frame so that it points to where the next frame boundary is expected to be, and return to 1110 to start again on the next frame.

Figure 12:
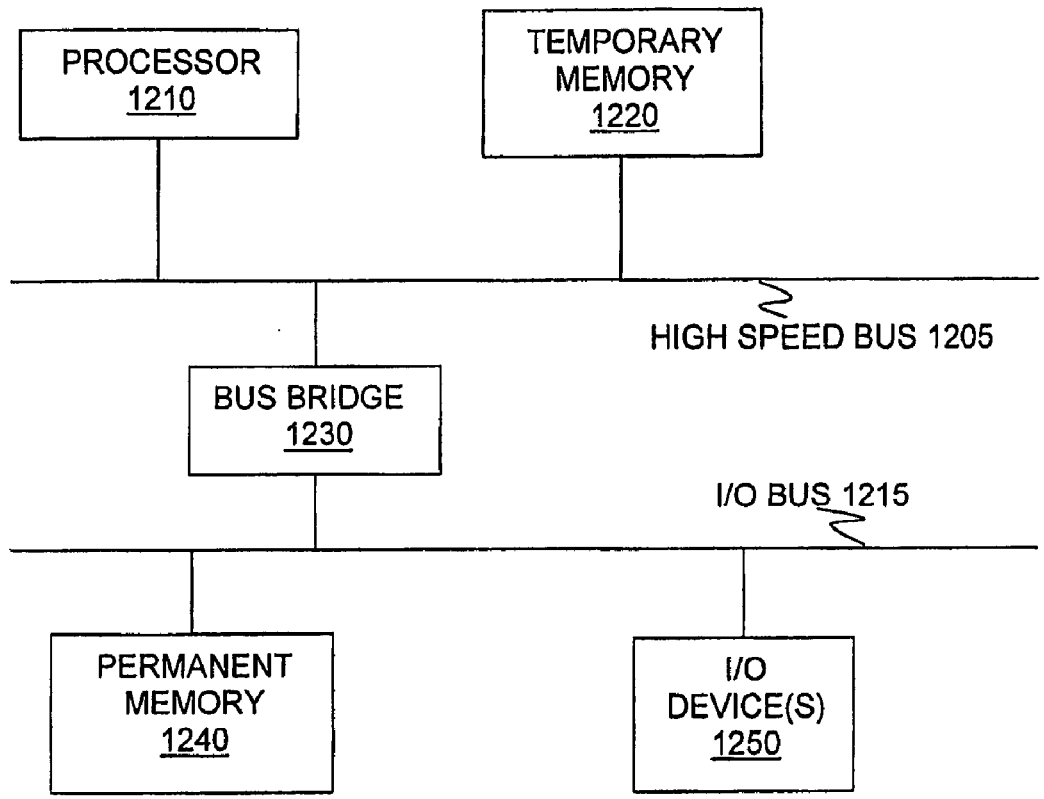
FIG. 12 illustrates one embodiment of a hardware system that can perform various functions of the present invention.

FIG. 12 illustrates one embodiment of a generic hardware system that can bring together the functions of various embodiments of the present invention. In the illustrated embodiment, the hardware system includes processor 1210 coupled to high speed bus 1205, which is coupled to input/output (I/O) bus 1215 through bus bridge 1230. Temporary memory 1220 is coupled to bus 1205. Permanent memory 1240 is coupled to bus 1215. I/O device(s) 1250 is also coupled to bus 1215. I/O device(s) 1250 may include a display device, a keyboard, one or more external network interfaces, etc.

Certain embodiments may include additional components, may not require all of the above components, or may combine one or more components. For instance, temporary memory 1220 may be on-chip with processor 1210. Alternately, permanent memory 1240 may be eliminated and temporary memory 1220 may be replaced with an electrically erasable programmable read only memory (EEPROM), wherein software routines are executed in place from the EEPROM. Some implementations may employ a single bus, to which all of the components are coupled, while other implementations may include one or more additional buses and bus bridges to which various additional components can be coupled. Similarly, a variety of alternate internal networks could be used including, for instance, an internal network based on a high speed system bus with a memory controller hub and an I/O controller hub. Additional components may include additional processors, a CD ROM drive, additional memories, and other peripheral components known in the art.

Figure 13:
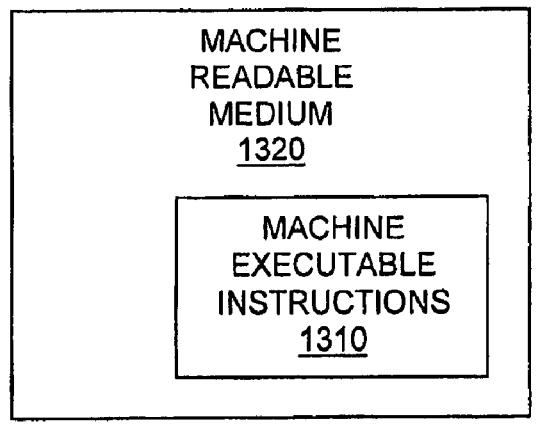
FIG. 13 illustrates one embodiment of a machine readable medium to store instructions that can implement various functions of the present invention.

Various functions of the present invention, as described above, can be implemented using one or more of these hardware systems. In one embodiment, the functions may be implemented as instructions or routines that can be executed by one or more execution units, such as processor 1210, within the hardware system(s). As shown in FIG. 13, these machine executable instructions 1310 can be stored using any machine readable storage medium 1320, including internal memory, such as memories 1220 and 1240 in FIG. 12, as well as various external or remote memories, such as a hard drive, diskette, CD-ROM, magnetic tape, digital video or versatile disk (DVD), laser disk, Flash memory, a server on a network, etc. These machine executable instructions can also be stored in various propagated signals, such as wireless transmissions from a server to a client. In one implementation, these software routines can be written in the C programming language. It is to be appreciated, however, that these routines may be implemented in any of a wide variety of programming languages.

In alternate embodiments, various functions of the present invention may be implemented in discrete hardware or firmware. For example, one or more application specific integrated circuits (ASICs) could be programmed with one or more of the above described functions. In another example, one or more functions of the present invention could be implemented in one or more ASICs on additional circuit boards and the circuit boards could be inserted into the computer(s) described above. In another example, one or more programmable gate arrays (PGAs) could be used to implement one or more functions of the present invention. In yet another example, a combination of hardware and software could be used to implement one or more functions of the present invention.

Thus, detecting and preventing errors in acoustic data is described. Whereas many alterations and modifications of the present invention will be comprehended by a person skilled in the art after having read the foregoing description, it is to be understood that the particular embodiments shown and described by way of illustration are in no way intended to be considered limiting. Therefore, references to details of particular embodiments are not intended to limit the scope of the claims.

What is claimed is:

1. A computer-implemented method, comprising:
    sending a data request from a host device to a client device, the client device operative to frame a stream of raw acoustic data at particular intervals with alignment information to create framed acoustic data, store the framed acoustic data, and provide the framed acoustic data to the host device in response to the data request;
    receiving the framed acoustic data at the host device from the client device; and
    checking for alignment errors among the framed acoustic data based on the alignment information.

2. The computer-implemented method of claim 1, the stream of raw acoustic data comprising pulse code modulation (PCM) data samples from a plurality of synchronously interleaved channels each corresponding to a different sensor in a sensor array of the client device.

3. The computer-implemented method of claim 1, the client device operative to count a particular number of data samples in the stream of raw acoustic data, identify a time slot between two samples after the particular number of data samples, insert a frame boundary identifier and a frame sequence number in the time slot, and repeat the counting, identifying, and inserting.

4. The computer-implemented method of claim 1, checking for alignment errors comprising:
    identifying a frame boundary identifier among the framed acoustic data received from the client device;
    determining a frame sequence number associated with the frame boundary identifier; and
    validating data samples associated with the frame boundary identifier if the frame sequence number is an expected frame sequence number.

5. The computer-implemented method of claim 1, checking for alignment errors comprising:
    if the current data sample matches the particular data pattern, setting a temporary pointer equal to a current pointer and incrementing the temporary pointer by a size of a frame of acoustic data;
    comparing a data sample at the temporary pointer to the particular data pattern; and
    if the data sample at the temporary pointer does not match the particular data pattern, incrementing the current pointer and returning to comparing the current data sample.

6. The computer-implemented method of claim 5, checking for alignment errors comprising:
    if the data sample at the temporary pointer matches the particular data pattern, identifying a first sequence value associated with the current pointer and a second sequence value associated with the temporary pointer;
    comparing the first sequence value to the second sequence value;
    if the second sequence value does not follow the first sequence value in a predetermined sequence, incrementing the current pointer and returning to comparing the current data sample; and
    if the second sequence value follows the first sequence value in the predetermined sequence, validating a frame worth of acoustic data samples following the current pointer, incrementing the current pointer by the size of a frame of acoustic data, and returning to comparing the current data sample.

7. A non-transitory machine readable medium having stored therein machine executable instructions that, when executed, implement a method comprising: sending a data request from a host device to a client device, the client device operative to frame a stream of raw acoustic data at particular intervals with alignment information to create framed acoustic data, store the framed acoustic data, and provide the framed acoustic data to the host device in response to the data request; receiving the framed acoustic data at the host device from the client device; and checking for alignment errors among the framed acoustic data based on the alignment information.

8. The non-transitory machine readable medium of claim 7 checking for alignment errors comprising: identifying a frame boundary identifier among the framed acoustic data received from the client device; determining a frame sequence number associated with the frame boundary identifier; and validating data samples associated with the frame boundary identifier if the frame sequence number is an expected frame sequence number.

9. The non-transitory machine readable medium of claim 7—checking for alignment errors comprising: setting a current pointer to a current data sample among the framed acoustic data received from the client device; comparing the current data sample to a particular data pattern; and if the current data sample does not match the particular data pattern, incrementing the current pointer and returning to comparing the current data sample.

10. The non-transitory machine readable medium of claim 9—checking for alignment errors comprising: if the current data sample matches the particular data pattern, setting a temporary pointer equal to the current pointer and incrementing the temporary pointer by a size of a frame of acoustic data; comparing a data sample at the temporary pointer to the particular data pattern; and if the data sample at the temporary pointer does not match the particular data pattern, incrementing the current pointer and returning to comparing the current data sample.

11. The non-transitory machine readable medium of claim 10—checking for alignment errors comprising: if the data sample at the temporary pointer matches the particular data pattern, identifying a first sequence value associated with the current pointer and a second sequence value associated with the temporary pointer; comparing the first sequence value to the second sequence value; if the second sequence value does not follow the first sequence value in a predetermined sequence, incrementing the current pointer and returning to comparing the current data sample; and if the second sequence value follows the first sequence value in the predetermined sequence, validating a frame worth of acoustic data samples following the current pointer, incrementing the current pointer by the size of a frame of acoustic data, and returning to comparing the current data sample.

12. A computer-implemented method, comprising:
receiving a data request from a host device at a client device;
receiving a stream of raw acoustic data at the client device;
framing the stream of raw acoustic data at particular intervals with alignment information to create framed acoustic data at the client device;
storing the framed acoustic data at the client device; and
providing the framed acoustic data from the client device to the host device, the host device operative to receive the framed acoustic data from the client device and to check for alignment errors among the framed acoustic data based on the alignment information.

13. The computer-implemented method of claim 12, comprising:
setting a current pointer to a current data sample among the framed acoustic data;
comparing the current data sample to a particular data pattern; and
if the current data sample does not match the particular data pattern, incrementing the current pointer and returning to comparing the current data sample.

14. A non-transitory machine readable medium having stored therein machine executable instructions that, when executed, implement a method comprising: receiving a data request from a host device at a client device; receiving a stream of raw acoustic data at the client device; framing the stream of raw acoustic data at particular intervals with alignment information to create framed acoustic data at the client device; storing the framed acoustic data at the client device; and providing the framed acoustic data from the client device to the host device, the host device operative to receive the framed acoustic data from the client device and to check for alignment errors among the framed acoustic data based on the alignment information.

15. The non-transitory machine readable medium of claim 14, comprising: setting a current pointer to a current data sample among the framed acoustic data; comparing the current data sample to a particular data pattern; and
if the current data sample does not match the particular data pattern, incrementing the current pointer and returning to comparing the current data sample.

* * * * *

UNITED STATES PATENT AND TRADEMARK OFFICE
CERTIFICATE OF CORRECTION

PATENT NO.       : 8,223,136 B2                                  Page 1 of 1
APPLICATION NO.  : 10/563034
DATED            : July 17, 2012
INVENTOR(S)      : Yongge Hu et al.

It is certified that error appears in the above-identified patent and that said Letters Patent is hereby corrected as shown below:

On the Title page, in field (54), and column 1, line 2, "Title", delete "INACOUSTIC" and insert -- IN ACOUSTIC --, therefor.

In column 11, line 16, in claim 8, delete "claim 7" and insert -- claim 7, --, therefor.

In column 11, line 24-25, in claim 9, delete "claim 7—" and insert -- claim 7, --, therefor.

In column 11, line 32-33, in claim 10, delete "claim 9—" and insert -- claim 9, --, therefor.

In column 11, line 42-43, in claim 11, delete "claim 10—" and insert -- claim 10, --, therefor.

Signed and Sealed this
Ninth Day of October, 2012

David J. Kappos
*Director of the United States Patent and Trademark Office*